(12) United States Patent
Malladi et al.

(10) Patent No.: US 12,373,212 B2
(45) Date of Patent: *Jul. 29, 2025

(54) IN-MEMORY COMPUTING WITH CACHE COHERENT PROTOCOL

(71) Applicant: Samsung Electronics Co., Ltd., Suwon-si (KR)

(72) Inventors: Krishna T. Malladi, San Jose, CA (US); Andrew Chang, Los Altos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,332

(22) Filed: Oct. 10, 2022

(65) Prior Publication Data

US 2023/0069786 A1 Mar. 2, 2023

Related U.S. Application Data

(63) Continuation of application No. 16/914,129, filed on Jun. 26, 2020, now Pat. No. 11,467,834.

(Continued)

(51) Int. Cl.
*G06F 9/30* (2018.01)
*G06F 9/38* (2018.01)
(Continued)

(52) U.S. Cl.
CPC ...... *G06F 9/30047* (2013.01); *G06F 9/30029* (2013.01); *G06F 9/3887* (2013.01);
(Continued)

(58) Field of Classification Search
CPC ............ G06F 9/30047; G06F 9/30029; G06F 9/3887; G06F 12/0828; G06F 13/1694; G06F 13/4221; G06F 2213/0026
(Continued)

(56) References Cited

U.S. PATENT DOCUMENTS 7,971,003 B2 6/2011 Cousin et al.
8,365,016 B2 1/2013 Gray et al.
(Continued)

FOREIGN PATENT DOCUMENTS

TW I610235 B 1/2018
TW 201937490 A 9/2019

OTHER PUBLICATIONS

Lenjani, Marzieh, et al., Fulcrum: A Simplified Control and Access Mechanism Toward Flexible and Practical in-Situ Accelerators, 2020 IEEE International Symposium on High Performance Computer Architecture, 14 pages.
(Continued)

*Primary Examiner* — Christopher B Shin
(74) *Attorney, Agent, or Firm* — Lewis Roca Rothgerber Christie LLP

(57) ABSTRACT

A system for computing. In some embodiments, the system includes: a memory, the memory including one or more function-in-memory circuits; and a cache coherent protocol interface circuit having a first interface and a second interface. A function-in-memory circuit of the one or more function-in-memory circuits may be configured to perform an operation on operands including a first operand retrieved from the memory, to form a result. The first interface of the cache coherent protocol interface circuit may be connected to the memory, and the second interface of the cache coherent protocol interface circuit may be configured as a cache coherent protocol interface on a bus interface.

20 Claims, 12 Drawing Sheets

Related U.S. Application Data

(60) Provisional application No. 63/003,701, filed on Apr. 1, 2020.

(51) Int. Cl.
  *G06F 12/08* (2016.01)
  *G06F 12/0817* (2016.01)
  *G06F 13/16* (2006.01)
  *G06F 13/42* (2006.01)

(52) U.S. Cl.
  CPC ...... *G06F 12/0828* (2013.01); *G06F 13/1694* (2013.01); *G06F 13/4221* (2013.01); *G06F 2213/0026* (2013.01)

(58) Field of Classification Search
  USPC ........................................................ 711/118
  See application file for complete search history.

(56) References Cited

U.S. PATENT DOCUMENTS

| | | | |
|---|---|---|---|
| 9,281,026 | B2 | 3/2016 | Felch et al. |
| 9,747,105 | B2 | 8/2017 | Gopal et al. |
| 11,126,548 | B1 | 9/2021 | Yudanov |
| 2003/0115402 | A1 | 6/2003 | Dahlgren et al. |
| 2008/0005484 | A1 | 1/2008 | Joshi |
| 2009/0083471 | A1 | 3/2009 | Frey et al. |
| 2013/0311753 | A1 | 11/2013 | Kandadai |
| 2014/0310232 | A1 | 10/2014 | Plattner et al. |
| 2015/0032968 | A1 | 1/2015 | Heidelberger et al. |
| 2016/0378465 | A1 | 12/2016 | Venkatesh et al. |
| 2017/0344479 | A1 | 11/2017 | Boyer et al. |
| 2017/0344546 | A1 | 11/2017 | Nam |
| 2017/0358327 | A1* | 12/2017 | Oh .......................... G11C 5/02 |
| 2018/0089093 | A1 | 3/2018 | Heidelberger et al. |
| 2018/0098869 | A1 | 4/2018 | Reis et al. |
| 2018/0191374 | A1 | 7/2018 | Wu et al. |
| 2019/0227981 | A1* | 7/2019 | Tomishima ......... G06F 15/7842 |
| 2019/0310911 | A1 | 10/2019 | Sundaram et al. |
| 2020/0026669 | A1* | 1/2020 | Kim ....................... G06F 13/24 |
| 2020/0065290 | A1 | 2/2020 | Natu |
| 2020/0117400 | A1 | 4/2020 | Golov |
| 2020/0125503 | A1* | 4/2020 | Graniello .............. G06F 3/0685 |
| 2020/0201932 | A1 | 6/2020 | Gradstein et al. |
| 2020/0294558 | A1* | 9/2020 | Yu ........................ G11C 7/1039 |
| 2020/0328879 | A1 | 10/2020 | Makaram et al. |
| 2020/0371973 | A1* | 11/2020 | Shan ..................... G06F 13/387 |
| 2021/0019147 | A1* | 1/2021 | Studer ................. G11C 11/4094 |
| 2021/0248094 | A1* | 8/2021 | Norman .............. G06F 12/0877 |
| 2021/0271597 | A1 | 9/2021 | Verma et al. |
| 2021/0271680 | A1* | 9/2021 | Lee ......................... G06F 9/544 |
| 2021/0279008 | A1 | 9/2021 | Lea et al. |
| 2021/0303265 | A1 | 9/2021 | Yudanov |
| 2021/0335393 | A1 | 10/2021 | Zhao et al. |
| 2021/0343334 | A1 | 11/2021 | Grover et al. |

OTHER PUBLICATIONS

Sano, Kentaro, et al., Systolic Computational Memory Approach to High-Speed Codebook Design, 2005 IEEE International Symposium on Signal Processing and Information Technology, 6 pages.
European Summons to attend oral proceedings action for Application No. 21166087.3, dated Dec. 20, 2022, 11 pages.
Singh, G. et al., "Near-Memory Computing: Past, Present, and Future", Aug. 7, 2019, pp. 1-16, arXiv:1908.02640v1.
Taiwanese Office Action dated Jul. 9, 2024, issued in corresponding Taiwanese Patent Application No. 110111352 (19 pages).

* cited by examiner

| ID | operation | Description |
|---|---|---|
| 0 | Rop = GIO | Column read data stored in Rop |
| 1 | Rop = WIO | Column write data stored in Rop |
| 2 | Rop = Rz | Copy ALU output Rz to Rop |
| 3 | GIO = Rz | Write back into Bank |
| 4 | RIO = GIO | Normal Read to DQ output |
| 5 | RIO = Rz | Drive Rz to DQ output |
| 6 | Rz = Rop (op) GIO | Operation with Rop and data from bank |
| 7 | Rz = Rop (op) WIO | Operation with Rop and broadcast data |
| 8 | Rz = WIO (op) GIO | Operation with broadcast data and bank |
| 9 | GIO = WIO | Normal Write from DQ input |

FIG. 1C

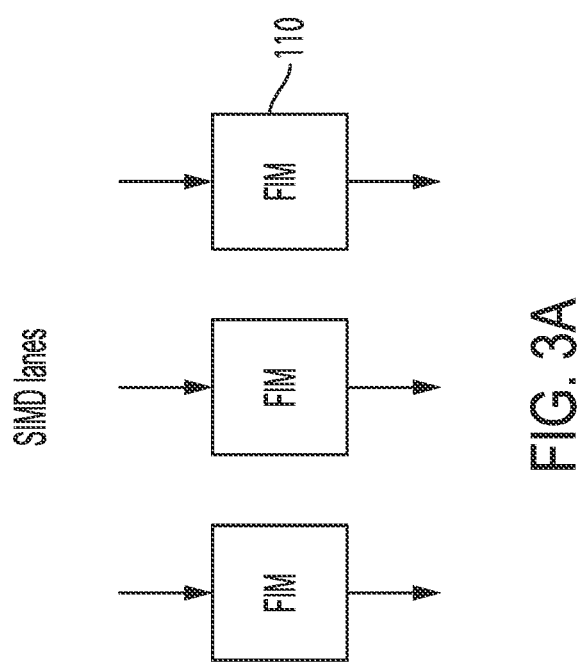

IN-MEMORY COMPUTING WITH CACHE COHERENT PROTOCOL

CROSS-REFERENCE TO RELATED APPLICATION(S)

This application is a continuation of U.S. patent application Ser. No. 16/914,129, filed on Jun. 26, 2020, now U.S. Pat. No. 11,467,834, which claims priority to and the benefit of U.S. Provisional Application No. 63/003,701, filed Apr. 1, 2020, entitled "IN-MEMORY COMPUTING WITH CXL," the entire contents of which are incorporated herein by reference.

FIELD

One or more aspects of embodiments according to the present disclosure relate to function-in-memory computation, and more particularly to a system and method for performing function-in-memory computation with a cache coherent protocol interface.

BACKGROUND

The background provided in this section is included only to set context. The content of this section is not admitted to be prior art. Function-in-memory computing may have advantages over other computing configurations, in that the total bandwidth for data paths between memory and a plurality of function-in-memory circuits may be significantly greater than the bandwidth of a data path between a memory and a central processing unit (CPU) or a graphics processing unit (GPU). Implementing function-in-memory computing may be challenging, however, in part because the execution of operations by the function-in-memory circuits may affect the latency of the operation of the memory.

Thus, there is a need for an improved system and method for performing function-in-memory computing.

SUMMARY

According to an embodiment of the present invention, there is provided a system for computing, the system including: a memory, the memory including one or more function-in-memory circuits; and a cache coherent protocol interface circuit having a first interface and a second interface, a function-in-memory circuit of the one or more function-in-memory circuits being configured to perform an operation on operands including a first operand retrieved from the memory, to form a result, the first interface of the cache coherent protocol interface circuit being connected to the memory, and the second interface of the cache coherent protocol interface circuit being configured as a cache coherent protocol interface on a bus interface.

In some embodiments: the function-in-memory circuits are arranged in a single instruction, multiple data configuration; or the function-in-memory circuits are arranged in a systolic configuration.

In some embodiments: the cache coherent protocol interface circuit is a Compute Express Link (CXL) interface circuit, and the bus interface is a Peripheral Component Interconnect express (PCIe) endpoint interface.

In some embodiments, a function-in-memory circuit of the one or more function-in-memory circuits is on a semiconductor chip with a dynamic random-access memory.

In some embodiments, the first interface is configured to operate according to a protocol selected from the group consisting of DDR2, DDR3, DDR4, and DDR5.

In some embodiments, a function-in-memory circuit of the one or more function-in-memory circuits includes: a plurality of registers, a plurality of multiplexers, and an arithmetic logic unit.

In some embodiments, a function-in-memory circuit of the one or more function-in-memory circuits is configured to perform an arithmetic operation selected from the group consisting of addition, subtraction, multiplication, and division.

In some embodiments, a function-in-memory circuit of the one or more function-in-memory circuits is configured to perform an arithmetic operation selected from the group consisting of floating-point addition, floating-point subtraction, floating-point multiplication, and floating-point division.

In some embodiments, a function-in-memory circuit of the one or more function-in-memory circuits is configured to perform a logical operation selected from the group consisting of bitwise AND, bitwise OR, bitwise exclusive OR, and bitwise ones complement.

In some embodiments, a function-in-memory circuit of the one or more function-in-memory circuits is configured, in a first state, to store the result in the memory, and, in a second state, to send the result to the cache coherent protocol interface circuit.

In some embodiments, the system further includes a host processing circuit connected to the second interface.

In some embodiments, the host processing circuit includes a PCIe root complex having a root port connected to the second interface.

According to an embodiment of the present invention, there is provided a system for computing, the system including: a memory; and a cache coherent protocol interface circuit having a first interface and a second interface, the cache coherent protocol interface circuit being configured to perform an arithmetic operation on data stored in the memory, the first interface of the cache coherent protocol interface circuit being connected to the memory, and the second interface being configured as a cache coherent protocol interface on a bus interface.

In some embodiments: the memory includes one or more function-in-memory circuits, and a function-in-memory circuit of the one or more function-in-memory circuits is configured to perform an operation on operands including a first operand retrieved from the memory, to form a result.

In some embodiments: the function-in-memory circuits are arranged in a single instruction, multiple data configuration; or the function-in-memory circuits are arranged in a systolic configuration.

In some embodiments: the cache coherent protocol interface circuit is a Compute Express Link (CXL) interface circuit, and the bus interface is a Peripheral Component Interconnect express (PCIe) endpoint interface.

In some embodiments, a function-in-memory circuit of the one or more function-in-memory circuits is on a semiconductor chip with a dynamic random-access memory.

In some embodiments, the first interface is configured to operate according to a protocol selected from the group consisting of DDR2, DDR3, DDR4, DDR5, GDDR, HBM, and LPDDR.

In some embodiments, a function-in-memory circuit of the one or more function-in-memory circuits is configured, in a first state, to store the result in the memory, and, in a second state, to send the result to the cache coherent protocol interface circuit.

According to an embodiment of the present invention, there is provided a method for computing, the method including: sending, by a host processing circuit, to a CXL interface circuit, one or more CXL packets; sending, by the CXL interface circuit, in response to receiving the CXL packets, to a function-in-memory circuit in a memory connected to the CXL interface circuit, an instruction; and performing, by the function-in-memory circuit, an operation, in accordance with the instruction, on operands including a first operand retrieved from the memory, to form a result.

BRIEF DESCRIPTION OF THE DRAWINGS

The drawings are included to provide examples only and should not be understood to limit the scope of the invention. These and other features and advantages of the present disclosure will be appreciated and understood with reference to the specification, claims, and appended drawings wherein:

FIG. 1C is a table of instructions for execution by a function-in-memory circuit, according to an embodiment of the present disclosure;

FIG. 3A is a function-in-memory configuration in which multiple function-in-memory circuits are arranged as a single instruction, multiple data processor, according to an embodiment of the present disclosure;

DETAILED DESCRIPTION

The detailed description set forth below in connection with the appended drawings is intended as a description of exemplary embodiments of a system and method for performing function-in-memory computing provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Function-in-memory circuits are, in some embodiments, processing circuits that are integrated with memory circuits or otherwise closer to the memory than, e.g., a CPU or a GPU connected to the memory by a standard memory bus. As such, the total bandwidth between a plurality of function-in-memory circuits and the memory may be considerably greater than that of a memory bus, enabling potentially greater processing throughput.

A memory including function-in-memory circuits, if connected to a CPU or a GPU with some interfaces, such as double data rate 2 (DDR2), DDR3, or the like, may not operate correctly in some circumstances. This may occur, in part because the latency of the responses produced by the function-in-memory circuits may violate the latency assumptions upon which the memory controller relies to maintain cache coherence (the uniformity of shared resource data that ends up stored in multiple local caches).

In some embodiments, this problem may be mitigated or solved using a cache coherent computer protocol (or "cache coherent protocol") such as Compute Express Link (CXL) interface to connect the memory to the CPU or GPU. Although some embodiments are described herein as using the CXL protocol the invention is not limited to such embodiments. For example, any other protocol suitable for preserving cache coherence (which may be referred to herein as a "cache coherent protocol") may be employed instead of CXL.

Figure 1A:
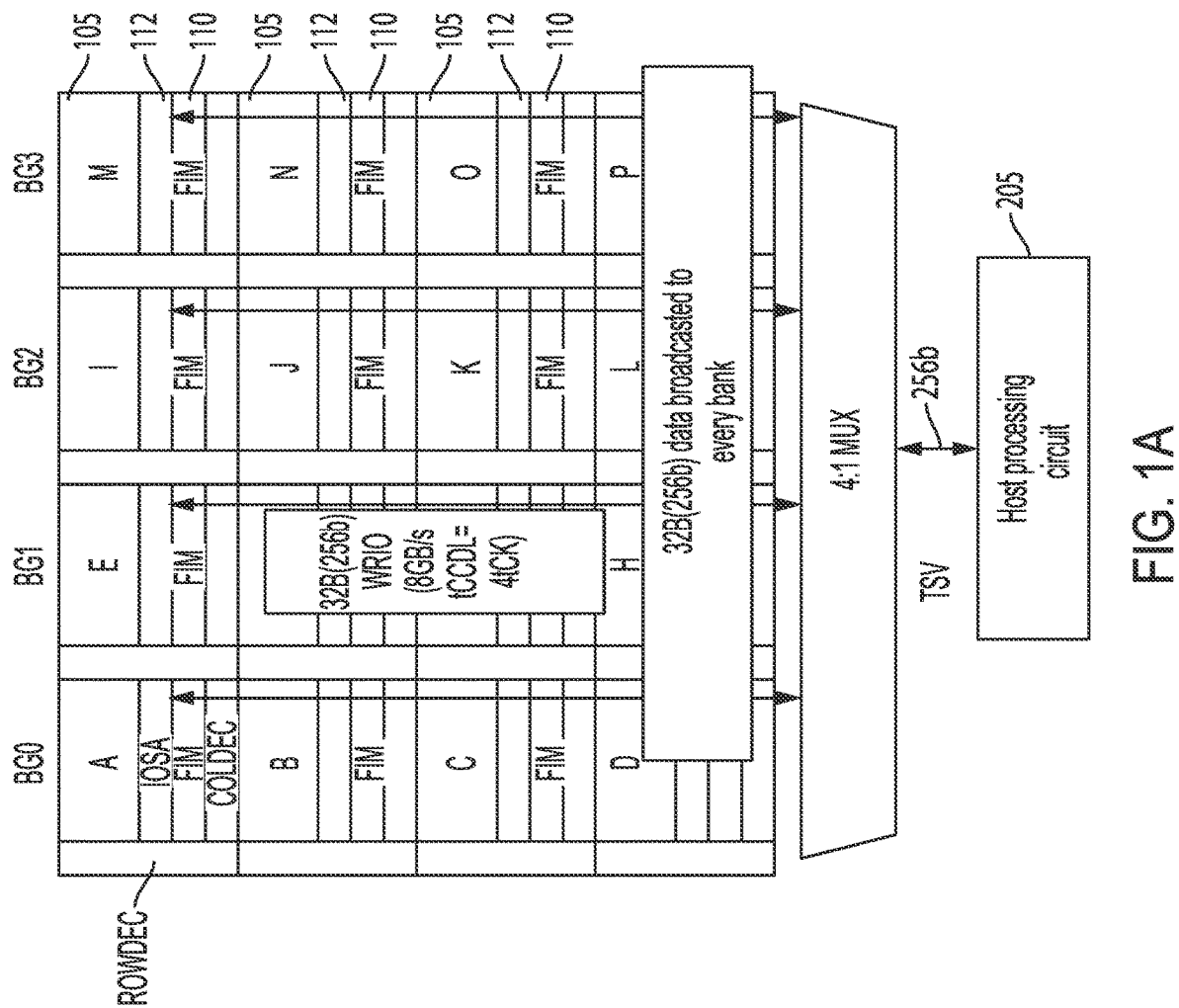
FIG. 1A is a block diagram of a memory including a plurality of bank groups each including a plurality of banks, the memory further including a plurality of function-in-memory circuits, according to an embodiment of the present disclosure.

Referring to FIG. 1A, in some embodiments, a memory (e.g., a high bandwidth memory (HBM) or dual in-line memory module (DIMM)) may be arranged as a plurality of bank groups (BG0, BG1, BG2, BG3) each including a plurality of banks 105 (with, e.g., BG0 including banks 105 labeled A, B, C, and D). Some features of FIG. 1A, such as through-silicon vias (TSV) are specific to HBM; other forms of memory (e.g., DIMM) may operate in an analogous manner, however. DRAM memory may be organized into ranks, chips, and banks 105. A "rank" may be a portion of the memory that has a shared chip-select pin. Each rank may include eight chips, and each chip may include 16 banks 105. The banks 105 of the chips may be organized into "megabanks", so that, for example, the set of banks 105 consisting of bank 0 from each of the eight chips in a rank may be megabank 0. The chips may be read in parallel, onto a 256-bit-wide bus, with each of the eight chips providing 32 bits of the 256 bits of data.

Figure 1B:
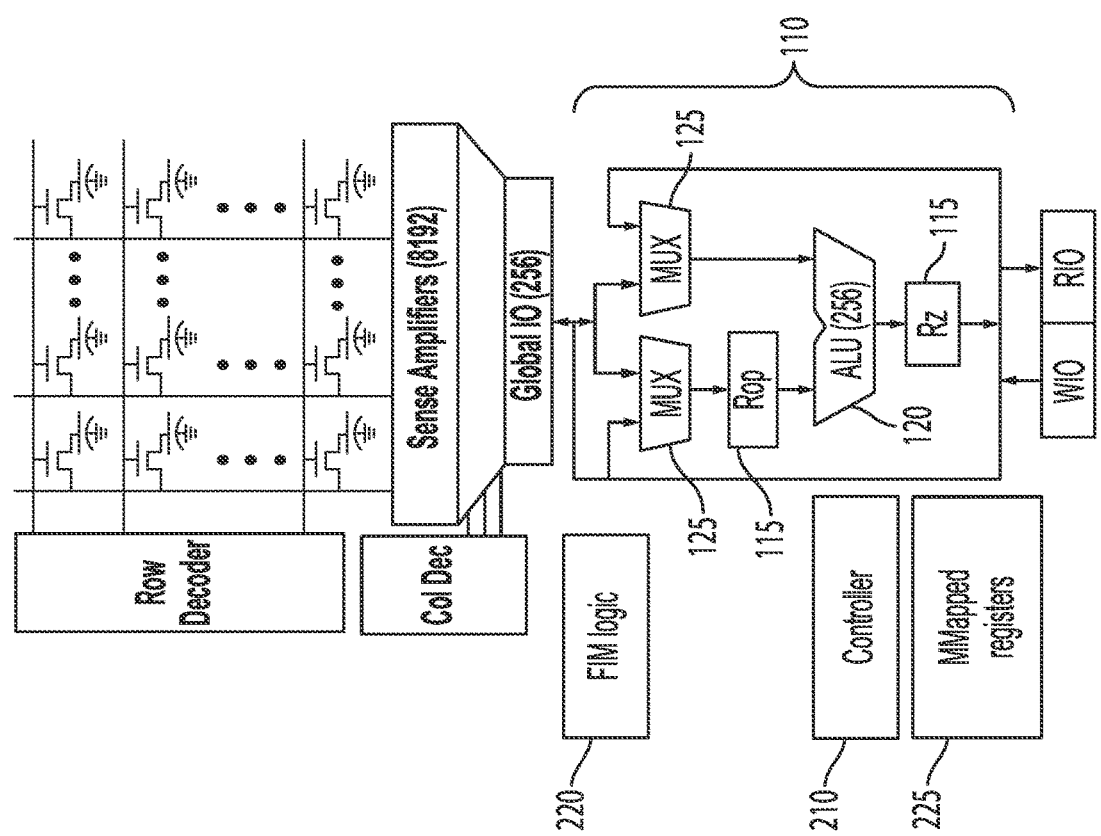
FIG. 1B is a block diagram of a memory bank with plurality of sense amplifiers, a global input output register, and a function-in-memory circuit, according to an embodiment of the present disclosure.

The memory may be connected to, and provide storage for, a host processing circuit 205 (e.g., a CPU or a GPU, or a CPU or a GPU with additional elements, such as a memory controller (MC)). In some embodiments, the host processing circuit 205 is on the host side of a network path (e.g., it is a host server). In an in-memory compute (IMC) system, each bank 105 may include an input/output sense amplifier 112 (IOSA), and a function-in-memory (FIM) circuit 110 (which may also be referred to as an "in-memory-compute circuit" or a "process in memory circuit"). As used herein, a function-in-memory circuit is a processing circuit that is capable of performing arithmetic operations or logical operations, and that is connected more directly to the memory than the host processing circuit 205 (and also more directly than an accelerator would be). For example, in a system in which memory is connected to the host processing circuit 205 by a DDR bus, a processing circuit on the memory side of the DDR bus may be considered a function-in-memory circuit, whereas a processing circuit (e.g., an accelerator on the host processing circuit side of the DDR bus, to which the host processing circuit 205 may delegate computing tasks) that is on the host processing circuit side of the DDR bus is not considered to be a function-in-memory circuit. FIG. 1B shows the structure of such a bank 105, in some embodiments, and FIG. 1C is a table showing a list of operations that may be performed by the function-in-memory circuit 110. In some embodiments, the host processing circuit 205 sends to the function-in-memory circuit 110 a number (e.g., a number between 0 and 9 corresponding to one of the rows of the table of FIG. 1C), and the function-in-memory circuit 110 then performs the corresponding operation. The instruction (or, equivalently, a number identifying the instruction) may be sent by the host processing circuit 205 to the function-in-memory circuit 110 through reserved-for-future-use (RFU) bits (e.g., RFU bits of a DDR interface).

As shown in FIG. 1B, the function-in-memory circuit 110 may include registers 115 (e.g., Rop and Rz), an arithmetic logic unit (ALU) 120, and multiplexers 125 (each labeled "MUX" in FIG. 1B), that together may be used to execute instructions (e.g., the instructions listed in the table of FIG. 1C). The function-in-memory circuit 110 may further include FIM logic 220, a controller 210, and memory-mapped registers 225 (discussed in further detail below). As shown in the table of FIG. 1C, the instructions may cause the function-in-memory circuit 110 to copy the contents of one register into another (e.g., instructions 0-5 and 9) or to perform an operation ("op") on the contents of two registers and to store the result in a third register (in the register Rz, in the case of the instruction set of the table of FIG. 1C). The operation may be an arithmetic operation (e.g., +, −, X, or /, performed, for example, according to IEEE-754), or a logical operation (e.g., bitwise & (AND), | (OR), ʌ(exclusive OR), or ~ (ones complement)). A register (e.g., one of the memory mapped registers 225) may specify the operation (e.g., the particular arithmetic operation or logical operation) to be performed when the instruction is one of instructions 6, 7, and 8 in the table of FIG. 1C. Returning to FIG. 1B, the arithmetic logic unit 120 may include a 16-lane, 16-bit floating point (FP-16) vector unit or an 8-lane, 32-bit floating point (FP-32) vector unit, making possible various operations. Non-limiting examples can include tensor operations (e.g., dot product, outer product, ReLU (rectifier, or rectifier linear unit), vsSqr (squaring the elements of a vector), and vsSQrt (taking the square root of each element of a vector)). For efficient use of the function-in-memory circuit 110, the data may be arranged in the memory so that multiple operands are concurrently available in the open row. As used herein, the "open row" refers to the data in the sense amplifiers 112 (after row activate is issued). The open row may, for example, include 8192 bits of data, from which the ALU may be able to read multiple operands (e.g., 32-bit operands).

The memory controller 206 (MC) of the host processing circuit 205 may be a memory controller complying with a standard for DRAM interfaces promulgated by the Joint Electron Device Engineering Council (JEDEC) and the BIOS of the host processing circuit 205; in such a case the memory controller 206 may implement no cache or limited cache. In some embodiments, the memory controller 206 may implement a different communication protocol that may not be JEDEC compliant, e.g., the timing constraints may be different, or the data bus, or the address and control bus, or both, could be split into two or more parts to provide a plurality of reduced-width buses. In some embodiments the memory controller 206 is transactional, i.e., instead of guaranteeing that the results of any memory access will be returned at a certain time, the host processing circuit 205 may wait until the memory controller 206 indicates that the requested data are ready. Instead of a cache hierarchy, the host processing circuit 205 may have only a scratchpad (for which cache coherence may not be required). In some embodiments, the host processing circuit 205 is connected to more than one memory, e.g., to a first memory that includes function-in-memory circuits 110 and for which no cache is present, and a second memory that lacks function-in-memory circuits and for which a cache hierarchy is present.

In operation, the host processing circuit 205 may first write operand values to the memory. This may involve broadcasting values to multiple banks (e.g., banks 105), as shown in FIG. 1A. Such broadcasting may reduce the number of write cycles used when an operand is re-used multiple times (e.g., in a matrix multiplication, in which each row of a first matrix may be multiplied by each column of a second matrix). The host processing circuit 205 may then cause processing to be performed in the memory by sending the addresses of operands to the memory (causing the contents of the addressed memory locations to be read into the global input output (global IO) register) and sending instructions (e.g., a number between 0 and 9, identifying one of the instructions in the table of FIG. 1C) to the function-in-memory circuit 110.

For example, the function-in-memory circuit 110 may perform a multiplication of a first operand and a second operand, and return the product to the host processing circuit 205, as follows. The host processing circuit 205 may send the address of the first operand to the memory (causing the first operand to be read into the global IO register), and send the number 0 (identifying instruction 0, in the table of FIG. 1C) to the function-in-memory circuit 110. The function-in-memory circuit 110 may then, upon receipt of instruction 0, store the first operand in the Rop register (e.g., copy it from the global IO register to the Rop register). The host processing circuit 205 may then send the address of the second operand to the memory (causing the second operand to be read into the global IO register), and send the number 6 (identifying instruction 6, in the table of FIG. 1C) to the function-in-memory circuit 110. The function-in-memory circuit 110 may then, upon receipt of instruction 6, calculate the product ("op" being multiplication in this case) of the two operands (the first operand being in the Rop register and the second operand being in the general IO register) and store the product in the register Rz. Finally, the host processing circuit 205 may send the number 5 (identifying instruction 5, in the table of FIG. 1C) to the function-inmemory circuit 110, causing the product (stored in the Rz register) to be written to the DQ output (i.e., returned to the host processing circuit 205).

As another example, the function-in-memory circuit 110 may perform a multiplication of a first operand and a second operand, and store the product in the memory, by following the same sequence of steps, except that the final instruction may be instruction number 3 (identifying instruction 3, in the table of FIG. 1C), causing the product to be written back to the memory (instead of being returned to the host processing circuit 205) at a location specified by an address concurrently sent to the memory by the host processing circuit 205.

Figure 2A:
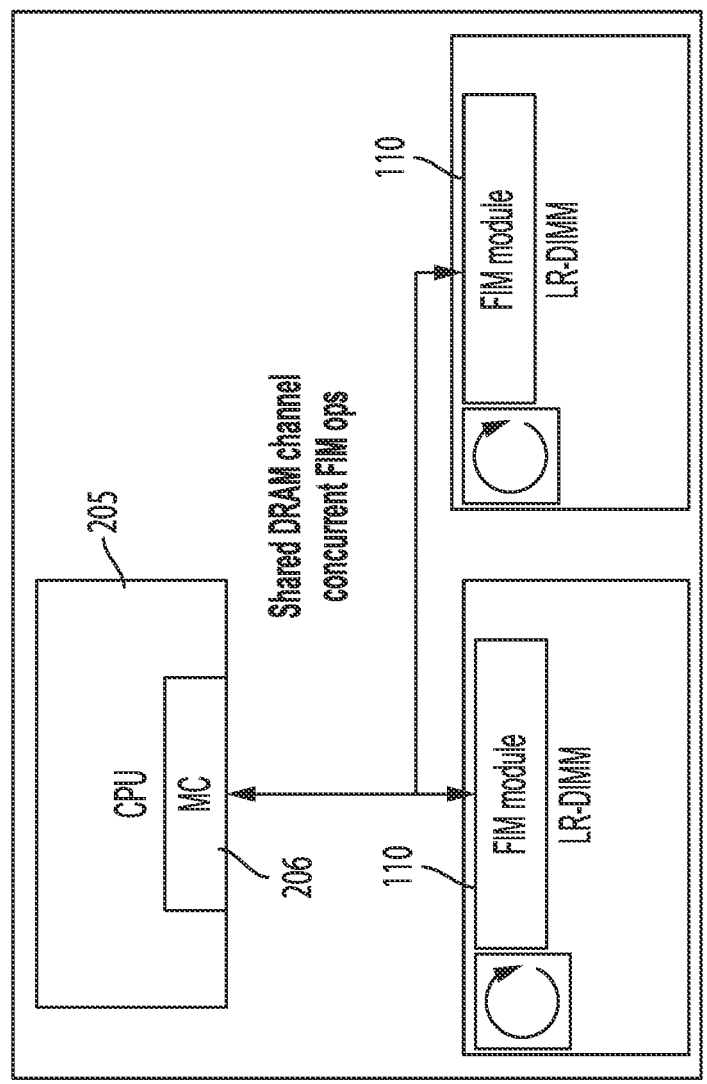
FIG. 2A is a block diagram of a function-in-memory configuration using a plurality of standard dynamic random-access memory (DRAM) modules, each connected to a function-in-memory circuit, the DRAM modules sharing a channel to a host processing circuit, according to an embodiment of the present disclosure.
Figure 2B:
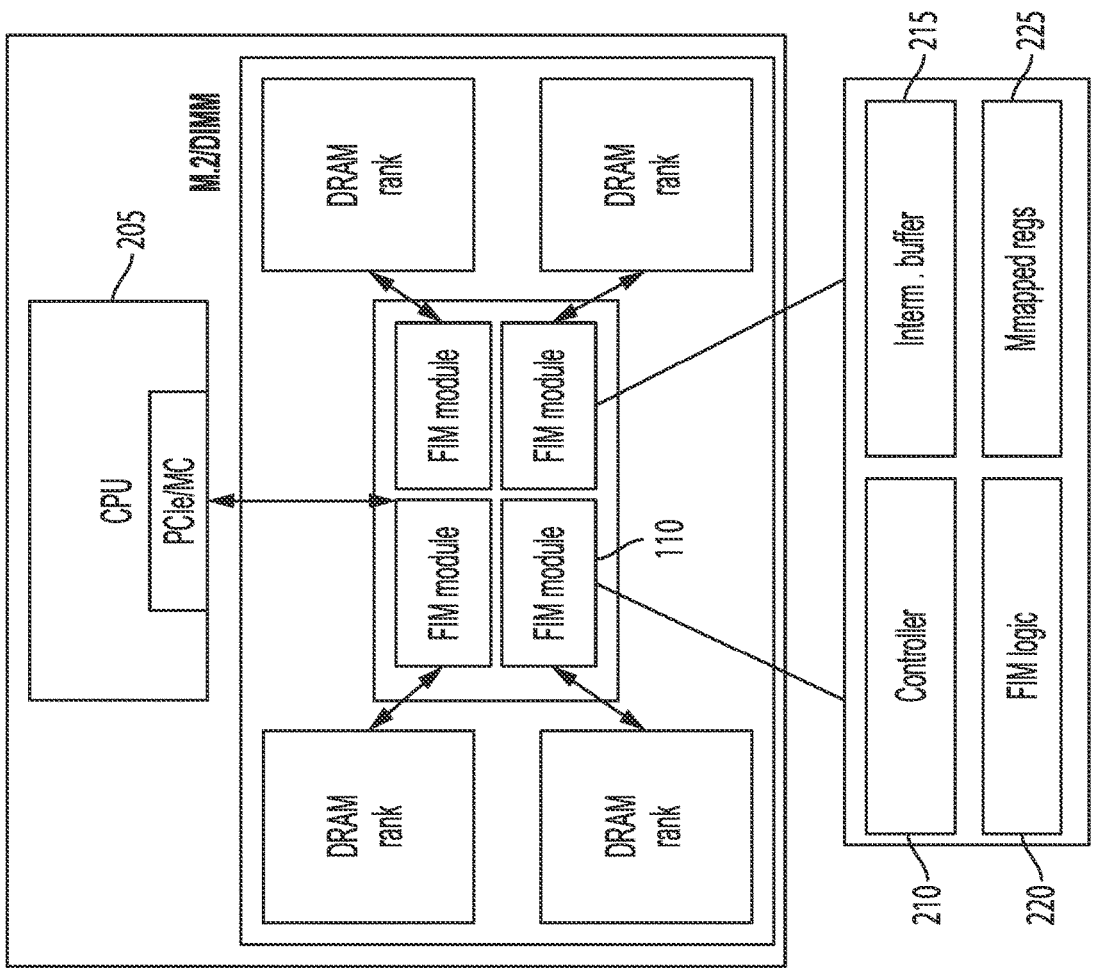
FIG. 2B is a block diagram of a function-in-memory configuration using a plurality of standard DRAM modules arranged in a plurality of ranks, each rank connected to a function-in-memory circuit, according to an embodiment of the present disclosure.

FIGS. 2A and 2B illustrate two configurations in which function-in-memory circuits 110 are implemented with standard dynamic random-access memory (DRAM) chips (i.e., without modifying the DRAM chips for use with the function-in-memory circuits 110). Although in some contexts a configuration such as this may be termed "function near memory", as used herein, the term "function-in-memory" includes configurations (such as those of FIGS. 2A and 2B) in which the function-in-memory circuit 110 is on a separate semiconductor chip from the memory. In the embodiment of FIG. 2A, several (e.g., two) DIMM modules share a channel to the host processing circuit 205 (which includes a CPU and a memory controller (MC)). Each of the DIMM modules includes a function-in-memory circuit 110 (or "FIM module"). The DIMM modules may be load-reduced DIMM (LR-DIMM) modules, to facilitate the sharing of the channel. In the embodiment of FIG. 2B, each of several ranks of a memory module is associated with a respective function-in-memory circuit 110. Each of the FIM modules in FIGS. 2A and 2B may include a controller 210, an intermediate buffer 215 (of which the Rop register of FIG. 1B may be an example), FIM logic 220, and memory-mapped registers 225. The memory of FIG. 2B may be in an M.2 or DIMM form factor. In the configuration of FIG. 2B, the function-in-memory circuit 110 may be fabricated on the buffer chip, which in a DIMM without function-in-memory circuits may be a chip that primarily performs retiming.

Figure 2C:
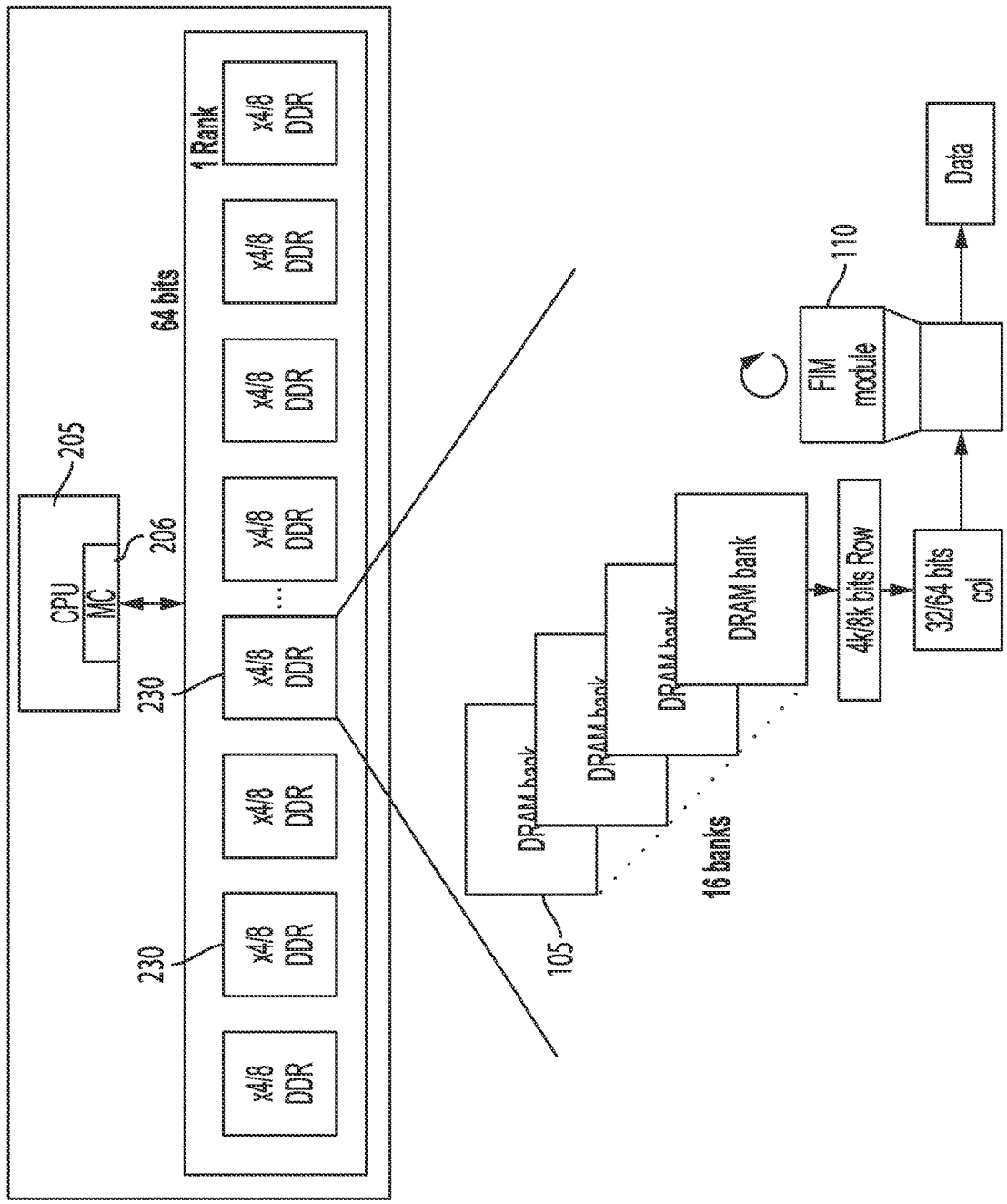
FIG. 2C is a block diagram of a function-in-memory configuration using a plurality of modified DRAM chips, each chip including a function-in-memory circuit, according to an embodiment of the present disclosure.
Figure 2D:
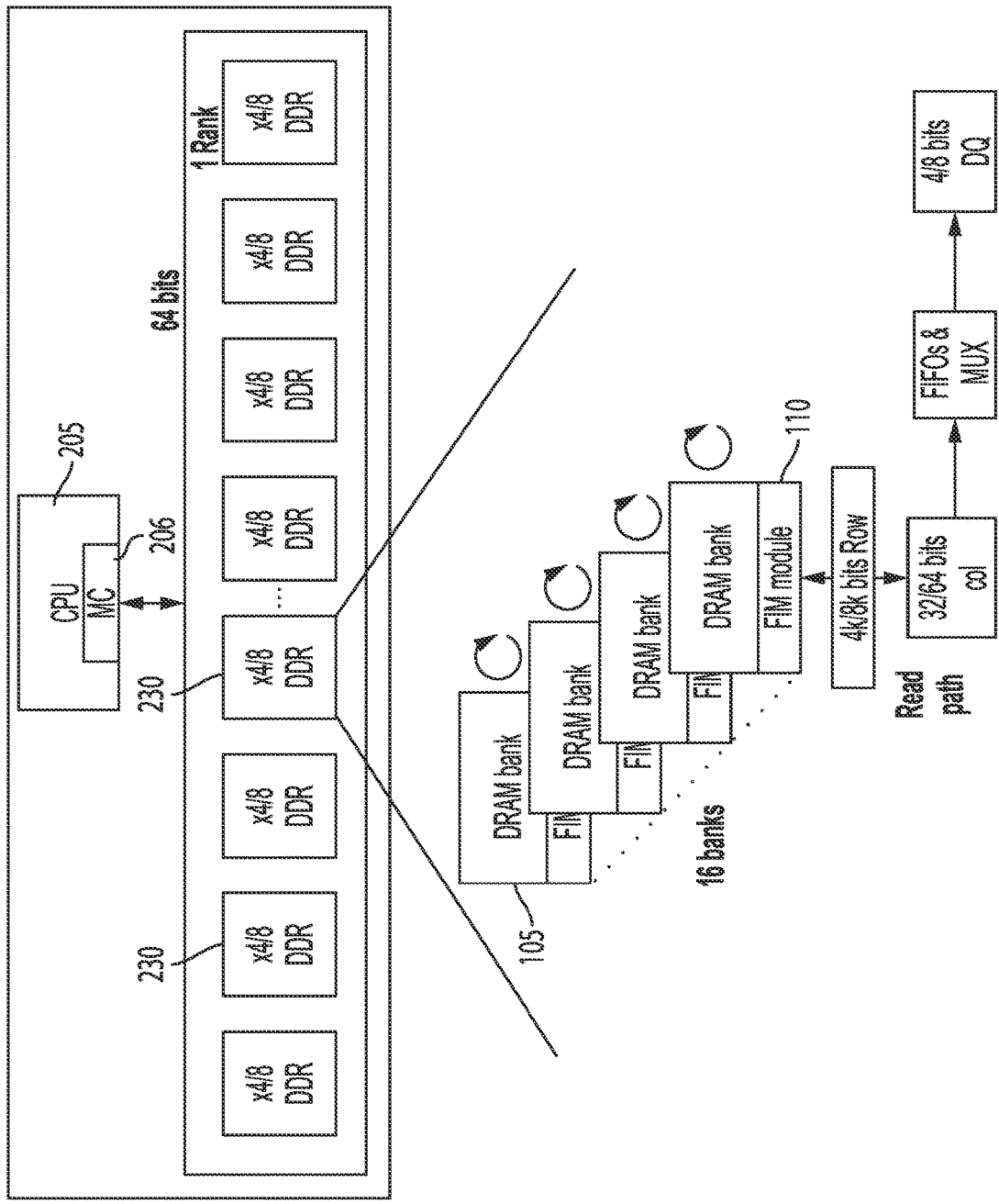
FIG. 2D is a block diagram of a function-in-memory configuration using a plurality of modified DRAM chips, each chip including a plurality of DRAM banks and a function-in-memory circuit for each bank, according to an embodiment of the present disclosure.

FIGS. 2C and 2D illustrate two different configurations in each of which function-in-memory circuits 110 are on the same chips (e.g., fabricated on the same silicon chips) as the DRAM. In the embodiment of FIG. 2C, each chip 230 includes a function-in-memory circuit 110. The configuration of FIG. 2C does not affect the DRAM core, and, in part for this reason, may be simpler to implement than the configuration of FIG. 2D. Moreover, routing (which may be challenging to accomplish with a limited number of metal layers in the configuration of FIG. 2D) may be simpler in the configuration of FIG. 2C. The configuration of FIG. 2C is logically similar to the configuration of FIG. 2B, in the sense that in each of these two configurations, a plurality of DRAM banks is connected to, and used by, a function-in-memory circuit 110. The configurations of FIGS. 2C and 2D may reduce the complexity of the buffer chip (compared to a configuration in which the function-in-memory circuit 110 is fabricated on the buffer chip). In the embodiments of FIGS. 2C and 2D, each chip 230 may be only slightly larger than a standard memory chip and, because there are no separate chips for the function-in-memory circuits 110, the chips 230 may be more readily accommodated in a standard form factor (e.g., on a DIMM) than the embodiments of FIGS. 2A and 2B, in which the function-in-memory circuits 110 are on separate chips from the DRAM, and therefore the chips (the DRAM chips and the chips containing the function-in-memory circuits 110) may occupy more board space.

In the embodiment of FIG. 2C, each function-in-memory circuit 110 accesses only one memory chip, and the cacheline may be entirely within one chip 230 (i.e., data may not be striped across multiple chips 230; such striping would make it difficult for the function-in-memory circuit 110 to perform useful operations). As used herein, "cacheline" means the granularity with which the host processing circuit 205 accesses memory (i.e., reads from memory and writes to memory). For example the cacheline may be 64 bytes for a CPU and the cacheline may be 128 bytes for a GPU.

In the embodiment of FIG. 2D, each memory bank 105 has associated with it a function-in-memory circuit 110, so that each chip 230 contains several (e.g., 16) function-in-memory circuits 110. The embodiment of FIG. 2D may include a larger number of function-in-memory circuits 110 than the embodiment of FIG. 2C and accordingly may exhibit better performance than the embodiment of FIG. 2C. The changes to the IO path of each bank (as shown in FIG. 1B, which also illustrates a configuration with one function-in-memory circuit 110 for each bank of memory), may consume more chip area than, and the complexity of the design may be greater than, e.g., that of the embodiment of FIG. 2C, in part because of the challenges of accomplishing the signal routing with a limited number of metal layers. In the embodiment of FIG. 2D, the function-in-memory circuits 110 in each bank 105 may operate, at any time, on the same address, because too few DRAM control bits may be available to make independent address selection feasible.

Data flow between function-in-memory circuits 110 may occur in various ways. In some embodiments, the function-in-memory circuits 110 and their associated portions of memory may be configured as a single instruction, multiple data (SIMD) parallel processor, as illustrated in FIG. 3A. Each of the function-in-memory circuits 110 may, at any time, perform the same instruction as the other function-in-memory circuits 110, with a different operand or with different operands. After each operation, the results of the operation may be returned to the host processing circuit 205 or saved in the memory, as discussed above in the context of FIG. 1B.

Figure 3B:
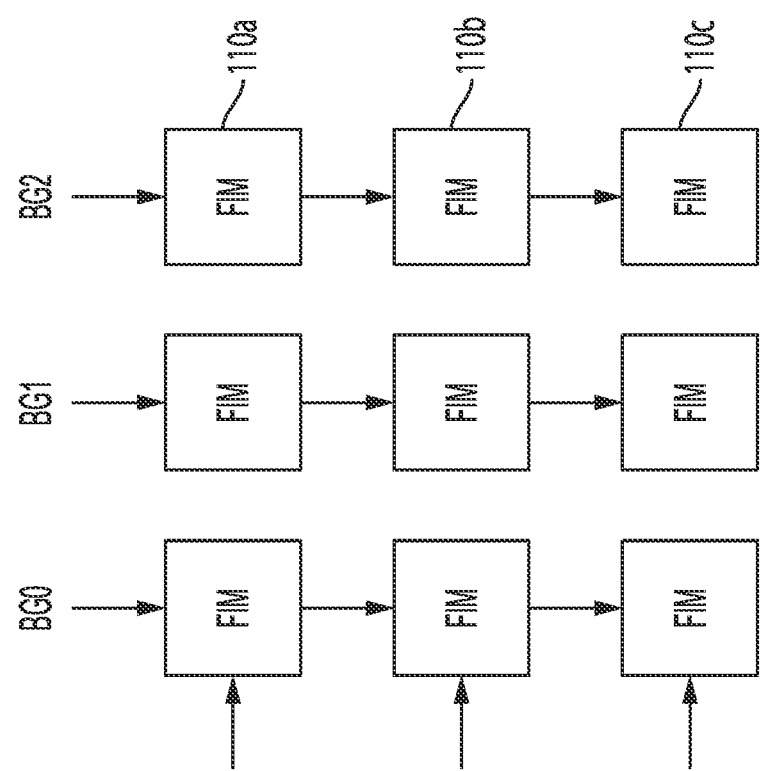
FIG. 3B is a function-in-memory configuration in which multiple function-in-memory circuits are arranged in a systolic array, according to an embodiment of the present disclosure.

In some embodiments, the function-in-memory circuits 110a, 110b, 110c (collectively referred to as function-in-memory circuits 110) and their associated portions of memory may be configured as a systolic array, which can refer to a homogeneous network of tightly-coupled data processing circuits, as illustrated in FIG. 3B. In such an embodiment, the result of each operation of a first function-in-memory circuit 110a may be passed on, as an argument for a subsequent operation, to a subsequent, second function-in-memory circuit 110b in the network. In some embodiments, each bank group can be connected to a respective chain of function-in-memory circuits 110, as illustrated in FIG. 3B, and there are no connections between the chains. The data paths between banks 105 within each bank group may already be present in standard memory architectures (e.g., DIMM or HBM), although the logic for communicating between connected function-in-memory circuits 110 may not be present; such logic may be added, if the configuration of FIG. 3B is to be used. The logic may include additional conductors between connected function-in-memory circuits 110, that may be employed, for example, by the first function-in-memory circuit 110a to notify its downstream neighbor, the second function-in-memory circuit 110b, that data on the common bus is intended for the downstream neighbor. The function-in-memory circuits 110 may be connected to a common bus, and it may only be possible for one of the function-in-memory circuits 110 at a time to drive the bus. As such, suitable logic and arbitration may be used to enable communications between the function-in-memory circuit 110 while avoiding bus contention. The embodiment of FIG. 3B may be poorly suited to some computations. The embodiment of FIG. 3B, however, may have the advantage, for computations for which it is suited, that the host processing circuit 205 is not burdened with intermediate results, as it may be if a similar computation were instead performed with the embodiment of FIG. 3A. In some embodiments, a system according to FIG. 3A or according to FIG. 3B may be employed to perform, or to perform parts of, basic linear algebra subprograms (BLAS) level 1 (BLAS1), or level 2 (BLAS2), or general matrix multiplication (GEMM) (which may be part of BLAS3). To perform a GEMM calculation, the system may select the order of the loops executed so as to maximize parallelism. A system according to FIG. 3A or according to FIG. 3B may also be capable of performing operations on transposed operands (e.g., it may be capable of calculating the matrix products AB, $A^T B$, or $AB^T$), without the host processing circuit 205 first having re-ordered the data in memory.

Figure 4A:
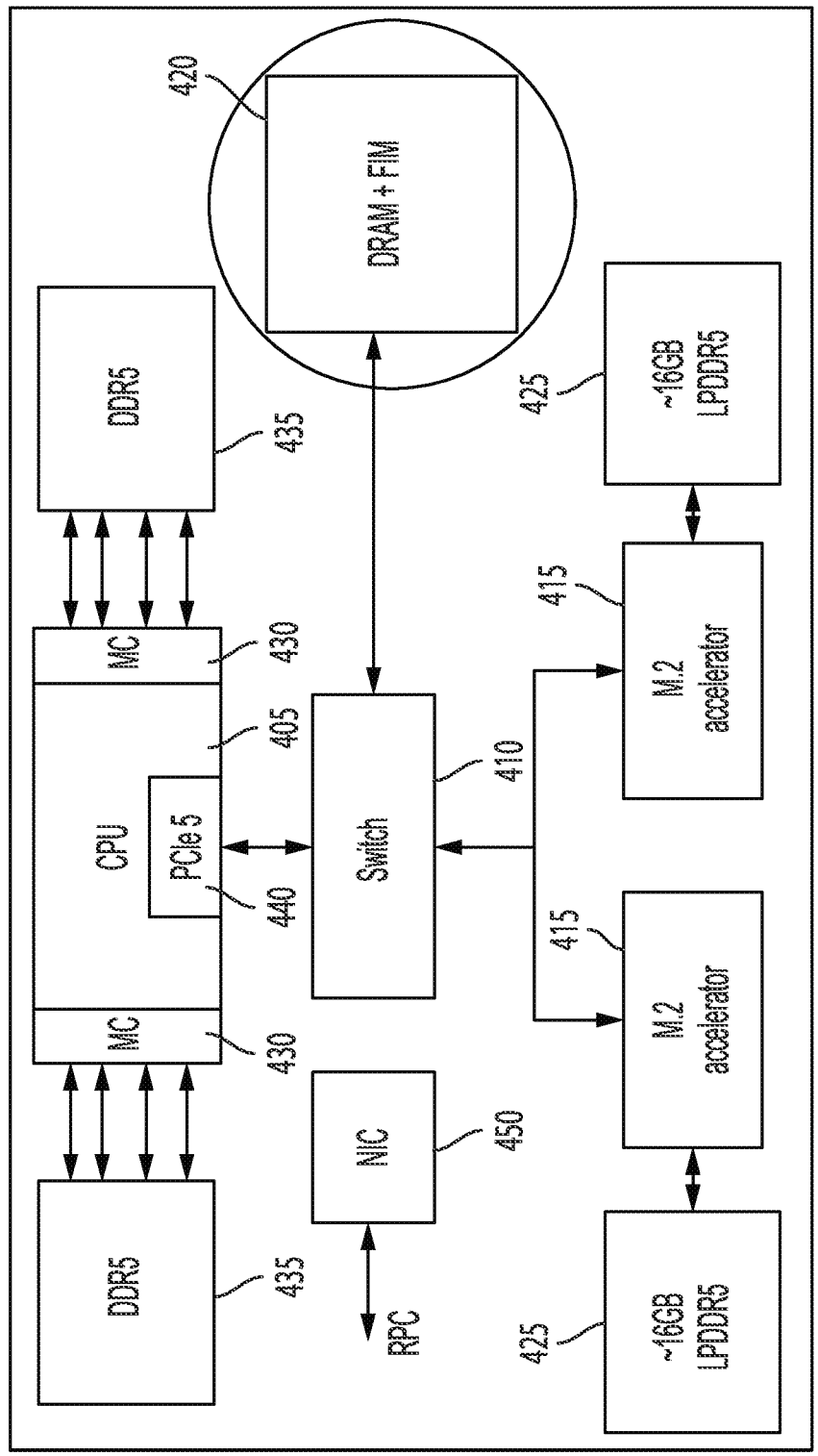
FIG. 4A is a block diagram of a system for computing, according to an embodiment of the present disclosure.

FIG. 4A shows a system for computing, in some embodiments. The system for computing includes a CPU 405 (which may operate as a host processing circuit), connected through a switch 410 to a plurality of (e.g., two) hardware accelerators 415 and to a system for performing function-in-memory computing 420. Each of the hardware accelerators 415 is connected to a respective memory 425 (e.g., a low-power DDR5 memory), and may include a GPU, or a CPU, or an application specific integrated circuit (ASIC), or a field programmable gate array (FPGA). Each of the hardware accelerators 415 may be configured to receive, from the CPU 405, computing tasks delegated to it by the CPU 405, execute the delegated computing tasks, and (i) return the results to the CPU 405 or (ii) store the results for additional, subsequent processing, or for later retrieval by the CPU 405. Similarly, the system for performing function-in-memory computing 420 (discussed in further detail below, in the context of FIG. 4B) may be configured to receive, from the CPU 405, computing tasks delegated to it by the CPU 405, execute the delegated computing tasks, and (i) return the results to the CPU 405 or (ii) store the results for additional, subsequent processing, or for later retrieval by the CPU 405. As used herein, a "computing task" is any collection of operations to be performed by a computer; as such, a computing task may consist of, or include, a plurality of smaller computing tasks.

The system for computing may include a network interface card 450 connected to the CPU 405, making possible the delegation, through remote procedure calls (RPCs), of computing tasks by, e.g., another processing system, to the system for computing. The CPU 405 may include one or more (e.g., two) memory controllers 430 each connected to a respective memory (e.g., a DDR5 memory) 435. The CPU 405 may further include a PCIe root complex 440 (e.g., a PCIe 5 root complex, as shown), a root port of which may be connected to the switch 410. The switch 410 may be configured to switch PCIe packets and it may be aware of CXL, so as to be able to handle the packet sizes and formats of CXL (which may be different from traditional PCIe), and so that it may perform routing and forwarding on a 64-byte packet basis. The switch 410 may be compatible with the version of PCIe (e.g., PCIe 5) used by the PCIe root complex 440 of the CPU 405.

The communications engaged in by the CPU 405, through the switch 410, with the hardware accelerators 415 and with the system for performing function-in-memory computing 420 may comply with the Compute Express Link (CXL) protocol. CXL is an open standard interconnect for high-speed CPU-to-device and CPU-to-memory. CXL is a layer on the PCIe protocol, i.e., CXL packets may be PCIe packets. In some embodiments, CXL is a transaction protocol that overlays on top of the PCIe electrical PHY layer. The use of the CXL interface to connect the hardware accelerators 415 and the system for performing function-in-memory computing 420 to the CPU 405 (through the switch 410) may have the advantage that the CPU may hold cached copies of memory regions in the CXL device enabling fine-grain sharing between CPU and the accelerator. On the other hand, the accelerator can also access host cache regions helping it in faster completion. PCIe has variable latency, so this notion helps in memory acceleration that has undetermined latency while making sure the CPU can still use the memory accelerator as a traditional memory device. Further, cache coherence may be unaffected by the delegation of computing tasks to the hardware accelerators 415, and to the system for performing function-in-memory computing 420, by the CPU 405.

Figure 4B:
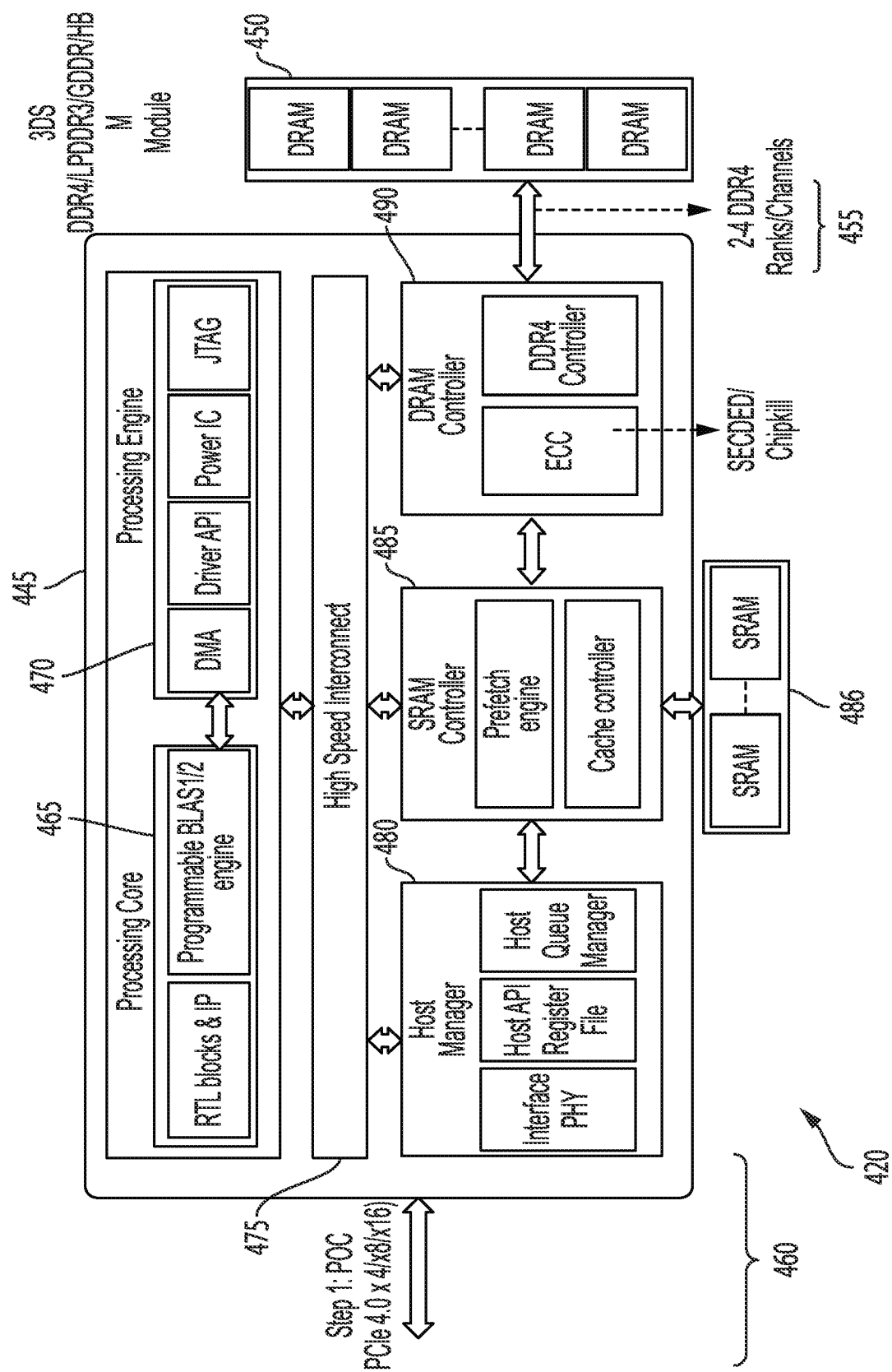
FIG. 4B is a block diagram of a system for performing function-in-memory computing.

FIG. 4B shows the system for performing function-in-memory computing 420, in some embodiments. The system for performing function-in-memory computing 420 may include a near-data accelerator, or "CXL interface circuit" 445, and a memory module 450 including function-in-memory circuits 110 (e.g., according to one of the embodiments illustrated in FIGS. 2A-2D). The CXL interface circuit 445 may have a first interface 455 (e.g., a DDR2, DDR3, DDR4, DDR5, GDDR, HBM, or LPDDR interface) for communicating with the memory module 450, and a second interface (e.g., a CXL interface on a bus interface, such as a PCIe endpoint interface) 460 for communicating with the CPU 405 (e.g., through the switch 410).

The CXL interface circuit 445 may operate as an interface adapter circuit, between the CXL interface 460 and the first interface 455, enabling the CPU 405 to delegate computing tasks to the function-in-memory circuits 110 of the memory module 450. In some embodiments, control flow may be executed first. A stream of instructions may be written to a consecutive portion of memory and a beginning pointer, the size may then be written to a register and a door-bell may be rung (i.e., setting an interrupt register). The device recognizes the instruction stream, and acknowledges after ensuring data integrity using CRC. The device may then operate on the instructions and the memory region while continuing to provide processor responses for regular memory instructions. The processing engine 470 provides all the auxiliary functions such as DMA and power management. DMA enables the device to communicate with other IO devices in the system such as a network card or a GPU or another in-memory processing device. Once the operation is finished, a door-bell register is set that the CPU is waiting on (using interrupt or polling). The CPU then reads back the results and acknowledges the receipt. Consecutive instruction streams from the CPU are pipelined and have a priority attached to them to help efficient execution on the in-memory processing unit The CXL interface circuit 445 may also operate as an accelerator, e.g., performing a computing task delegated to it by the CPU 405 with or without a portion of the computing task being further delegated (by the CPU 405 or by the CXL interface circuit 445) to the function-in-memory circuits 110 of the memory module 450. To enable such operation, the CXL interface circuit 445 may further include a processing core 465 and the processing engine 470, which may be designed to perform certain computing tasks (e.g., BLAS1 or BLAS2 operations) that may be well suited for delegation, by the CPU 405 (e.g., because the CPU may be relatively poorly suited for performing BLAS1 or BLAS2 operations). A high-speed interconnect 475 may connect the processing core 465 and the processing engine 470 to a host manager 480, an SRAM controller 485 (connected to a static random-access memory (SRAM) module 486), and a DRAM controller 490. The SRAM controller may be modified to issue cache snoop requests to the host as well (which is what CXL enables). It can also respond to host snoops (i.e., requests from the CPU to invalidate a line so that the host has to migrate the line to itself and modify, i.e., M state or S state). The host manager 480 may implement a CXL stack (including a PCIe stack). In some embodiments, the CXL stack is responsible for decoding CXL Type-2 or Type-3 memory and accelerator transaction requests. At the link level, it implements link protection and flow control. At the PHY layer, it is similar to PCIe 5.0. In some embodiments, the circuits enabling the CXL interface circuit 445 to operate as an accelerator are absent, and it operates only as an interface circuit to the memory module 450 and the function-in-memory circuit 110 that the memory module 450 contains.

Figure 5:
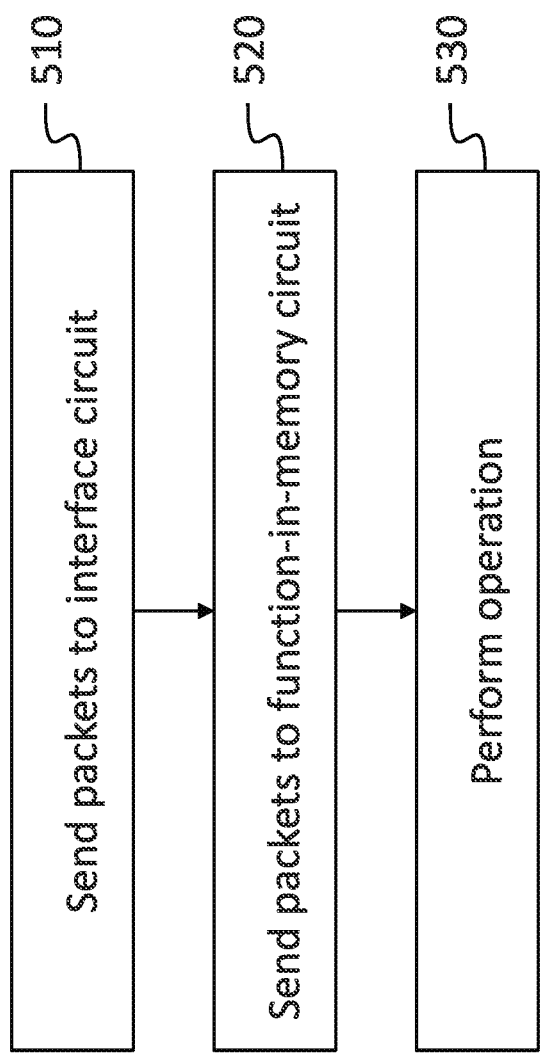
FIG. 5 is a flow chart of a method for computing, according to an embodiment of the present disclosure.

FIG. 5 shows a flow chart for a method for computing in some embodiments. The method includes, sending, at 510, by a host processing circuit, to a CXL interface circuit, a plurality of CXL packets, and sending, at 520, an instruction by the CXL interface circuit to a function-in-memory circuit (in a memory connected to the CXL interface circuit), in response to receiving the CXL packets. The method further includes, performing, at 530, by the function-in-memory circuit, an operation, in accordance with the instruction, on operands including a first operand retrieved from the memory, to form a result.

As used herein, the term "or" should be interpreted as "and/or", such that, for example, "A or B" means any one of "A" or "B" or "A and B". It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of a system and method for performing function-in-memory computing have been specifically described and illustrated herein, many modifications and variations will be apparent to those skilled in the art. Accordingly, it is to be understood that a system and method for performing function-in-memory computing constructed according to principles of this disclosure may be embodied other than as specifically described herein. The invention is also defined in the following claims, and equivalents thereof.

What is claimed is:

1. A system for computing, the system comprising:
a memory comprising a function-in-memory circuit, the function-in-memory circuit to perform an operation on data retrieved from the memory to form a result in the memory; and
an interface circuit having a first interface and a second interface, and comprising a processing circuit to perform a computing task comprising a matrix-based operation, the processing circuit being located in a component that is external from the function-in-memory circuit, and being located between the first interface and the second interface, such that a signal for performing the computing task is received by the processing circuit from the second interface, and a result of the computing task is sent from the processing circuit to the first interface,
the first interface being connected to the memory, and
the second interface being configured to receive communications via a bus interface in compliance with a cache-coherent protocol.

2. The system of claim 1, wherein:
the function-in-memory circuit is arranged in a parallel processor configuration; or
the function-in-memory circuit is arranged in a network of data processing circuits configuration.

3. The system of claim 1, wherein the cache-coherent protocol comprises compute express link (CXL).

4. The system of claim 1, wherein a function-in-memory circuit is on a semiconductor chip with a dynamic random-access memory.

5. The system of claim 1, wherein the first interface is configured to operate according to a protocol comprising a double data rate memory.

6. The system of claim 1, wherein a function-in-memory circuit comprises:
a register,
a multiplexer, and
an arithmetic logic unit.

7. The system of claim 1, wherein a function-in-memory circuit is configured to perform an arithmetic operation comprising addition, subtraction, multiplication, or division.

8. The system of claim 1, wherein a function-in-memory circuit is configured to perform an arithmetic operation comprising floating-point addition, floating-point subtraction, floating-point multiplication, or floating-point division.

9. The system of claim 1, wherein a function-in-memory circuit is configured to perform a logical operation comprising bitwise AND, bitwise OR, bitwise exclusive OR, and bitwise ones complement.

10. The system of claim 1, wherein:
the data comprises an operand, and
the function-in-memory circuit is configured to:
in a first state, store the result in the memory, and,
in a second state, send the result to the interface circuit.

11. The system of claim 1, further comprising a host processing circuit connected to the second interface.

12. The system of claim 11, wherein the host processing circuit comprises a root complex connected to the second interface.

13. A system for computing, the system comprising:
a memory comprising a function-in-memory circuit, the function-in-memory circuit to perform an operation on data retrieved from the memory to form a result in the memory; and
an interface circuit having a first interface and a second interface, and comprising a processing circuit to perform a computing task comprising a matrix-based operation, the processing circuit being located in a component that is external from the function-in-memory circuit, and being located between the first interface and the second interface, such that a signal for performing the computing task is received by the processing circuit from the second interface, and a result of the computing task is sent from the processing circuit to the first interface,
the first interface being connected to the memory, and
the second interface being configured to receive communications via a bus interface in compliance with a cache-coherent protocol.

14. The system of claim 13, wherein the data comprises an operand.

15. The system of claim 14, wherein:
the function-in-memory circuit is arranged in a parallel processor configuration; or
the function-in-memory circuit is arranged in a network of data processing circuits configuration.

16. The system of claim 14, wherein the cache-coherent protocol comprises compute express link (CXL).

17. The system of claim 14, wherein a function-in-memory circuit is on a semiconductor chip with a dynamic random-access memory.

18. The system of claim 14, wherein the first interface is configured to operate according to a protocol comprising a double data rate memory.

19. The system of claim 14, wherein a function-in-memory circuit is configured, in a first state, to store the result in the memory, and, in a second state, to send the result to the interface circuit.

20. A method for computing, the method comprising:
receiving, by a cache coherent protocol interface circuit, a packet from a host processing circuit; and
sending, by the cache coherent protocol interface circuit, based on receiving the packet, to a function-in-memory circuit in a memory connected to the cache coherent protocol interface circuit, an instruction,
wherein the cache coherent protocol interface circuit is configured to receive communications via a bus interface in compliance with a cache-coherent protocol, and comprises a processing circuit to perform a computing task comprising a matrix-based operation, the processing circuit being located in a component that is external from the function-in-memory circuit, and being located between a first interface, connected to the function-in-memory circuit, and the bus interface, such that a signal for performing the computing task is received by the processing circuit from the bus interface, and a result of the computing task is sent from the processing circuit to the first interface, and
wherein the function-in-memory circuit is configured to perform an operation on data retrieved from the memory to form a result in the memory.

* * * * *

UNITED STATES PATENT AND TRADEMARK OFFICE
CERTIFICATE OF CORRECTION

PATENT NO. : 12,373,212 B2
APPLICATION NO. : 18/045332
DATED : July 29, 2025
INVENTOR(S) : Krishna T. Malladi et al.

Page 1 of 1

It is certified that error appears in the above-identified patent and that said Letters Patent is hereby corrected as shown below:

In the Claims

In Column 13, Line 30, in Claim 4, delete "a" and insert -- the --.

In Column 13, Line 36, in Claim 6, delete "a" and insert -- the --.

In Column 13, Line 41, in Claim 7, delete "a" and insert -- the --.

In Column 13, Line 45, in Claim 8, delete "a" and insert -- the --.

In Column 13, Line 49, in Claim 9, delete "a" and insert -- the --.

In Column 13, Line 51, in Claim 9, delete "OR, and" and insert -- OR, or --.

In Column 14, Line 28, in Claim 17, delete "a" and insert -- the --.

In Column 14, Line 34, in Claim 19, delete "a" and insert -- the --.

Signed and Sealed this
Sixteenth Day of December, 2025

John A. Squires
*Director of the United States Patent and Trademark Office*